United States Patent [19]

Sager

[11] 4,411,720

[45] Oct. 25, 1983

[54] ULTRASONIC WELDING METHOD FOR SEALING A THERMOPLASTIC CAP TO THE NECK OF A THERMOPLASTIC CONTAINER

[75] Inventor: Thomas B. Sager, Newtown, Conn.

[73] Assignee: Branson Ultrasonics Corporation, Newtown, Conn.

[21] Appl. No.: 360,485

[22] Filed: Mar. 22, 1982

[51] Int. Cl.³ .......................... B29C 27/08; B65B 7/28
[52] U.S. Cl. ........................................ 156/69; 53/485; 53/489; 156/73.1; 156/580.2; 264/23
[58] Field of Search ............ 156/69, 73.1, 221, 580.1, 156/580.2; 264/23; 425/174.2; 228/110, 1 R; 53/471, 485, 489

[56] References Cited

U.S. PATENT DOCUMENTS

| | | | |
|---|---|---|---|
| 3,795,558 | 3/1974 | Dabney et al. | 156/73.1 |
| 3,824,138 | 7/1974 | Karobath et al. | 156/580.2 |
| 4,219,912 | 9/1980 | Adams | 156/73.1 |
| 4,259,419 | 3/1981 | Uba et al. | 156/580.1 |

Primary Examiner—Michael G. Witshyn
Attorney, Agent, or Firm—Ervin B. Steinberg; Philip J. Feig

[57] ABSTRACT

A method for sealing the neck of a thermoplastic container to a thermoplastic cap superposed upon the neck and the cap having a lateral edge extending beyond the periphery of the neck using an ultrasonic welding apparatus includes an ultrasonic resonator having a domical internal cavity in its output end for reshaping the lateral edge of the cap in order to form a peripheral bead along the interface between the cap and the neck of the container.

2 Claims, 6 Drawing Figures

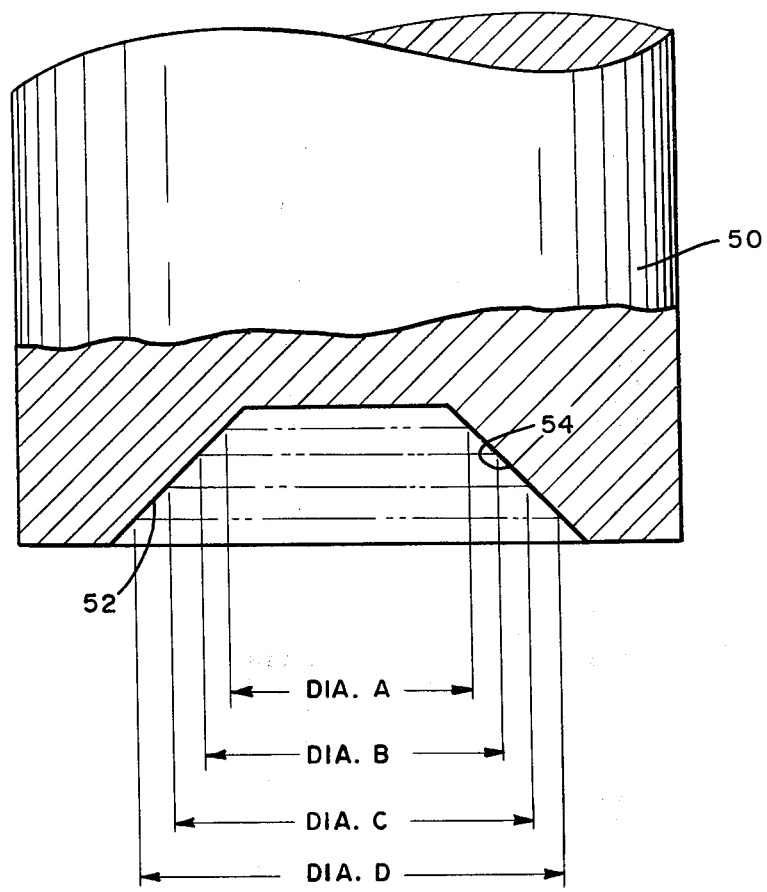

ULTRASONIC WELDING METHOD FOR SEALING A THERMOPLASTIC CAP TO THE NECK OF A THERMOPLASTIC CONTAINER

BACKGROUND OF THE INVENTION

This invention relates to a method for sealing a thermoplastic cap to the neck of a thermoplastic container using an ultrasonic welding apparatus. More specifically, the invention concerns the sealing of a thermoplastic flanged cap to the neck of a thermoplastic container, the flange of the cap being superposed on the neck and having a lateral edge which is extended beyond the periphery of the neck. The extended flange is reshaped by a cavity disposed in an ultrasonic resonator to provide a hermetically sealed capped container. Quite specifically, the invention concerns the dimensioning of the ultrasonic resonator forming a portion of the ultrasonic welding apparatus for accomplishing the sealing of the type stated above.

Ultrasonic sealing of caps to containers is well known in the art. For example, U.S. Pat. No. 3,494,817, issued to A. E. Whitecar, entitled "Rotary Turret Sonic Welding Apparatus", dated Feb. 10, 1970, discloses a cap having a flange for being welded to the upper surface of the neck of a container using an ultrasonic welding apparatus. The flange is dimensioned to be of the same diameter or of a slightly smaller diameter than the diameter of the neck. While the apparatus has been successful in joining a cap to a container, there have been instances where a non-hermetic seal is formed. The present invention provides an apparatus for sealing a cap of similar shape to the neck of a container while providing greatly improved reliability in forming such a seal.

In accordance with the present invention, the flange of the cap is dimensioned to be slightly larger than the diameter of the neck of the container. For sealing, an ultrasonic resonator is used which is provided with a domical cavity extending axially from the output surface of the resonator toward the input surface, the maximum opening of the cavity being disposed at the output surface and being at least equal to the diameter of the container neck. As the resonator is urged into intimate contact with the flange of the cap and ultrasonic energy is applied, the periphery of the flange begins to melt and soften. As the engagement force is continued between the flange and container, the container neck likewise begins to soften and melt under the influence of the ultrasonic energy which manifests itself in a combined longitudinal and shear direction. The extended flange material becomes trapped within the domical cavity of the resonator and conforms to the shape of the cavity. When the ultrasonic energy ceases and the softened and melted material solidifies while the engagement force is maintained, the cap flange becomes welded to the neck of the container. The excess material which has been trapped in the cavity forms a bead along the weld line, thus assuring a hermetic seal.

A principal object of the present invention is, therefore, the provision of an ultrasonic resonator having a cavity disposed in its output surface for use in connection with an ultrasonic welding apparatus for forming a hermetically sealed container.

Another object of the invention is the provision of an ultrasonic resonator having a domical cavity extending axially from the output surface of the resonator toward the input surface, the cavity being in the shape of a thermoplastic flanged cap to be joined to a thermoplastic container neck and having a maximum opening at the output surface at least equal to the dimension of the container neck.

Further objects of the invention will become more clearly apparent when the following description is read in conjunction with the accompanying drawings.

BRIEF DESCRIPTION OF THE DRAWINGS

FIG. 6 is an elevational view, partly in section, of another modified ultrasonic resonator.

DETAILED DESCRIPTION OF THE INVENTION

Figure 1:
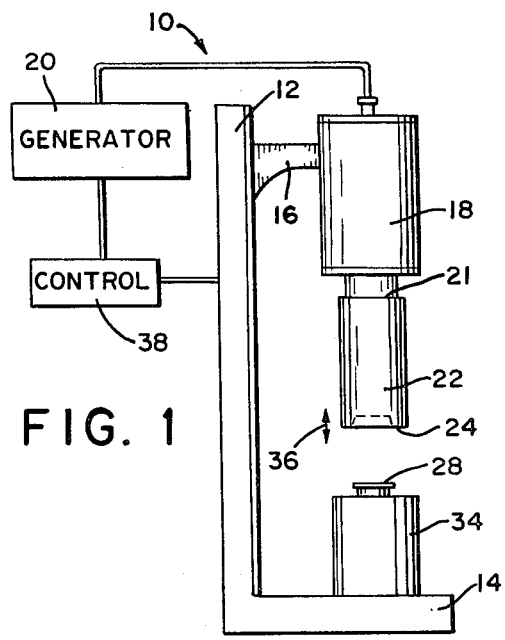
FIG. 1 is a schematic representation of an ultrasonic welding apparatus useful for practising the invention.

Referring now to the drawings and FIG. 1 in particular, there is shown a preferred embodiment of an apparatus used for practising the present invention. Numeral 10 refers to a stand having a vertical column 12 and a base plate 14. Mounting means 16 supports an electroacoustic converter 18. Responsive to the operation of motive means, not shown, the converter 18 is adapted to move reciprocatingly from its raised position toward the base plate 14 and return to the raised position shown. The converter 18 is coupled to the input surface 21 of a half wavelength resonator 22. When energized from an electrical generator 20, the converter 18 provides mechanical vibrations to the resonator 22 which is set into resonance along its longitudinal axis. The converter 18 includes either magnetostrictive or piezoelectric means (not shown) to convert the electrical energy to mechanical output vibration and may be constructed as disclosed, for instance, in U.S. Pat. No. 3,524,085, issued to A. Shoh, entitled "Sonic Transducer", dated Aug. 11, 1970. A suitable stand which is shown herein only schematically is disclosed in detail in U.S. Pat. No. 3,790,059, issued to S. E. Jacke et al, entitled "Ultrasonic Apparatus", dated Feb. 5, 1974.

Figure 2:
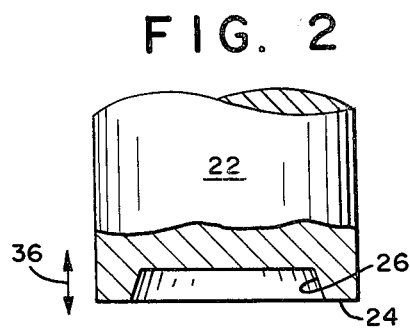
FIG. 2 is an elevational view, partly in section, of a portion of a preferred embodiment of the ultrasonic resonator forming the invention.

The frontal portion of resonator 22 is best seen in FIG. 2. The output surface 24 is disposed at an antinodal region of longitudinal motion of the resonator 22 and includes a concentrically disposed domical cavity 26 extending axially from the output surface 24 of the resonator toward the input surface 21 of the resonator. The maximum diameter of the cavity is located at the output surface 24 and is dimensioned to be at least equal to the diameter of the neck of a container to be sealed as will be described hereinafter. When the resonator is rendered resonant, the cavity wall surface applies a combination of longitudinal and shear mode vibratory energy to the plastic material contacting such cavity surface.

Figure 3:
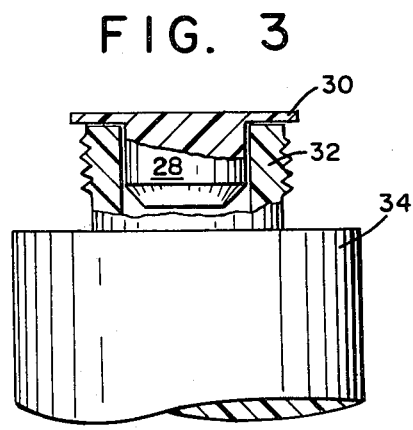
FIG. 3 is an elevational view, partly in section, of the cap and the container prior to welding.

FIG. 3 shows a thermoplastic cap 28 having a planar flange 30 disposed upon the upper surface of the neck 32 of a thermoplastic container 34. The neck may be threaded externally as shown. The flange 30 is dimensioned to laterally extend slightly beyond the periphery of the neck 32 to provide excess flange material. Typically, for a neck diameter of approximately one inch the flange 30 extends radially beyond the neck 32 by approximately 0.025 inches.

In order to weld the cap 28 to the neck 32, responsive to a signal from control unit 38 to the motive means, mounting means 16 descends along column 12 until the cavity wall surface of resonator 22 engages the flange 30. Upon sufficient engagement force, control unit 38 activates the generator 20. Alternatively, the generator 20 may be activated prior to engagement between the resonator 22 and flange 30. Generator 20, in turn, provides a high frequency electrical energy signal to the converter 18. The converter 18 converts the electrical energy into high frequency vibratory motion which is coupled to resonator 22. Since output surface 24 is dimensioned to be disposed at an antinodal region of longitudinal motion, the output surface 24 will undergo longitudinal motion in the direction as indicated by the double headed arrow 36. The high frequency energy, typically, is at a frequency in the range between one and 100 kHz, and preferably at a frequency of 20 kHz.

Under the combined influence of the applied engagement force and ultrasonic energy, the flange 30 begins to soften and melt. The peripheral overlapping portion of flange 30 becomes trapped along the tapered side wall of the domical cavity 26 of the resonator 22. As the flange 30 is contacted by the resonator, the effect of the engagement force urging the resonator 22 toward base 14 and ultrasonic energy, causes the interface between the flange 30 and neck 32 to soften and melt. The descent of the mounting means 16 is limited, by means known in the art, for causing the trapped flange material within cavity 26 to be reshaped at a location substantially along the interface between the flange 30 and the neck 32. After a weld time sufficient to melt the required portions of flange 30 and neck 32, the control unit 38 deactivates generator 20 while maintaining the engagement force between the resonator 22 and the combination of cap 28 and container 34. When, after a short time interval, the softened and melted thermoplastic material has solidified, the control means 38 causes the mounting means 16 to ascend along column 12 back to its original raised position.

Figure 4:
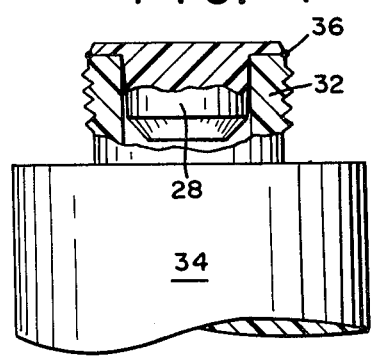
FIG. 4 is an elevational view, partly in section, of the cap and of the container after welding.

As best seen in FIG. 4, when the resonator returns to its raised position the cap 28 and neck portion 32 have been welded together to form a hermetic seal. The excess flange material from the radially extended portion of the flange 30 forms a circumferential weld bead 36 around the weld joint joining the cap 28 to the neck portion 32. The contouring of the resonator as described causes the presence of the weld bead 36 which provides the improved hermetic seal.

Ultrasonic forming of thermoplastic material is well known in the art as shown, for instance, in U.S. Pat. No. 3,972,758, issued to J. E. Bieber, entitled "Method of Forming Over a Plastic Jacket Against a Workpiece Using Vibratory Energy" dated Aug. 3, 1976, or in U.S. Pat. No. 3,795,558, issued to W. C. Dabney et al, entitled "Method of Ultrasonic Sealing Hollow Members", dated Mar. 5, 1974.

Figure 5:
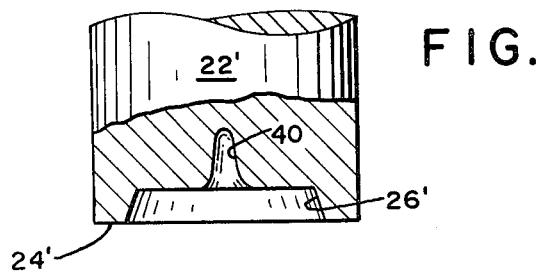
FIG. 5 is an elevational view, partly in section, of a modified ultrasonic resonator per FIG. 2.

FIG. 5, shows a modification of the resonator 22' which includes a generally cylindrical aperture 40 extending from the domical cavity 26' toward the input surface 21' of the resonator. The addition of the aperture 40 accomodates the sealing of a cap having a nipple or a similar projection.

As shown in FIG. 6, a single resonator 50 can be used to seal containers having necks of different diameters. The cavity 52 disposed in the output end of the resonator 50 is dimensioned to have a maximum opening at least equal to the periphery of the largest neck to be sealed. Sealing of a smaller container neck is achieved by virtue of the neck and cap to be sealed contacting the sloped cavity wall surface 54 deeper within the cavity 52. As shown in FIG. 6, if the resonator 50 includes a cavity 52 dimensioned for sealing a container neck having a maximum diameter D, the same resonator 50 will also seal containers having smaller diameter necks, such as diameters A, B, or C. The requirement of changing the resonator for sealing different sized container necks is thus obviated when practicing the present invention.

In the prior art arrangement, when welding a flanged cap to a container, non-hermetic seals have been experienced on account of the fact that the superposed surfaces are rarely perfectly flat. Using the above described resonator, minor surface irregularities in the cap or container will not impair the provision of a hermetic seal since the peripheral weld bead 36 assures a reliable joint.

In the foregoing description it has been assumed that the container was constructed to be sufficiently rigid to self-support the engagement force exerted by the resonator 22. When a flexible container having a rigid neck portion is to be welded to a cap, suitable fixturing means, known in the art, must be provided to support the container or neck portion during welding. Likewise, the cap or cap with flange need not be rigid thermoplastic but may be a plastic film or a laminate material.

Moreover, in order to increase the production rate, a rotary table arrangement such as that described in the patent to Whitecar supra may be employed for multiple welding of containers, or for serially providing caps and containers under an ultrasonic resonator or a plurality of resonators.

The above described and illustrated apparatus is intended primarily for sealing a circular cap to a circular neck portion of a container. It will be obvious to those skilled in the art that a cap of other geometric configuration could be welded to a correspondingly shaped container neck by providing a resonator having a similarly shaped inclined cavity in its output portion. For example, a rectangular cap or cap flange can be welded to a rectangular neck or to a rectangular container when using a resonator having a corresponding inclined rectangularly shaped cavity disposed in its output portion.

While there has been described and illustrated a preferred method and apparatus and several modifications thereof, it will be apparent to those skilled in the art that further modifications and variations may be made without deviating from the broad principle of the invention which shall be limited solely by the scope of the appended claims.

What is claimed is:

1. A method for ultrasonically welding the neck of a thermoplastic container to a thermoplastic cap, the latter having a flange superposed upon said neck and said flange having a lateral edge extending beyond the periphery of said neck, comprising the steps of:
providing an elongated ultrasonic resonator, dimensioned to be resonant as a half wavelength resonator when energized with ultrasonic energy of predetermined frequency at an input end and adapted to provide ultrasonic vibrations at an opposite output end, said resonator having a domical internal cavity with tapered wall extending from said output end of said resonator axially toward said input end, the maximum opening of said cavity being at least equal to the periphery of said neck;

causing said output end of said resonator while rendered resonant to be in forced engagement with said cap and container for effecting, responsive to the vibrations and the engagement force exerted by said resonator, thermoplastic material from the edge of said flange to be softened and displaced from said flange and to be trapped as a peripheral bead along the wall of said cavity, and ceasing ultrasonic vibrations when said trapped softened material is disposed as a peripheral bead around the interface between said flange and said neck of the container to permit said bead to solidify and to thereby form a seal between said cap and said neck.

2. A method for ultrasonically welding the neck of a thermoplastic container to a thermoplastic cap superposed upon said neck and said cap having a lateral edge extending beyond the periphery of said neck, comprising the steps of:

providing an elongated ultrasonic resonator, dimensioned to be resonant as a half wavelength resonator when energized with ultrasonic energy of predetermined frequency at an input end and adapted to provide ultrasonic vibrations at an opposite output end, said resonator having a domical internal cavity with tapered wall extending from said output end of said resonator axially toward said input end, the maximum opening of said cavity being at least equal to the periphery of said neck;

causing said output end of said resonator while rendered resonant to be in forced engagement with said cap and container for effecting, responsive to the vibrations and the engagement force exerted by said resonator, thermoplastic material from the edge of said cap to be softened and displaced from said cap and to be trapped as a peripheral bead along the wall of said cavity, and ceasing ultrasonic vibrations when said trapped softened material is disposed as a peripheral bead around the interface between said cap and said neck of the container to permit said bead to solidify and to thereby form a seal between said cap and said neck.

* * * * *